(12) United States Patent
Hazout

(10) Patent No.: US 8,070,405 B2
(45) Date of Patent: Dec. 6, 2011

(54) SELF DRILLING BOLT WITH ANCHOR

(76) Inventor: Eran Hazout, Yavne (IL)

( * ) Notice: Subject to any disclaimer, the term of this patent is extended or adjusted under 35 U.S.C. 154(b) by 0 days.

(21) Appl. No.: 12/552,312

(22) Filed: Sep. 2, 2009

(65) Prior Publication Data

US 2011/0027045 A1    Feb. 3, 2011

Related U.S. Application Data

(63) Continuation of application No. PCT/IL2008/000288, filed on Mar. 5, 2008.

(60) Provisional application No. 60/905,607, filed on Mar. 8, 2007.

(51) Int. Cl.
*F16B 25/10*   (2006.01)
(52) U.S. Cl. .................................. 411/387.2; 411/387.1
(58) Field of Classification Search ............ 411/387.2, 411/29, 386, 387.1, 387.6
See application file for complete search history.

(56) References Cited

U.S. PATENT DOCUMENTS

| | | | |
|---|---|---|---|
| 2,024,064 A | 12/1935 | Schaefer | |
| 3,116,528 A | 1/1964 | Poe | |
| 3,453,927 A * | 7/1969 | Moore | 411/29 |
| 4,817,264 A | 4/1989 | Worthing | |
| 4,906,148 A | 3/1990 | Schule | |
| 5,246,323 A * | 9/1993 | Vernet et al. | 411/29 |
| 6,435,789 B2 * | 8/2002 | Gaudron | 411/344 |
| 6,679,661 B2 * | 1/2004 | Huang | 411/29 |
| 7,322,783 B2 * | 1/2008 | Pearce et al. | 411/29 |
| 2005/0084360 A1 * | 4/2005 | Panasik et al. | 411/44 |
| 2006/0067803 A1 * | 3/2006 | Hsu | 411/29 |

* cited by examiner

*Primary Examiner* — Gary Estremsky
(74) *Attorney, Agent, or Firm* — Hess Patent Law Firm, PC; Robert J. Hess

(57) ABSTRACT

An anchoring device having a tapered, at least partially threaded shank with a front end, a drilling head and at a rear end thereof, a torque applying head and an anchor coaxially enveloping a front portion of the shank. The arrangement is such that during drilling through the structure the anchor axially displaces towards the rear end of the shank, wherein the shank tightens against an inside surface of the anchor so as to expand the anchor within the bore being simultaneously drilled, for fixedly retaining thereof within the structure.

15 Claims, 10 Drawing Sheets

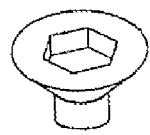 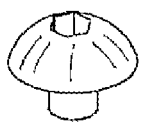 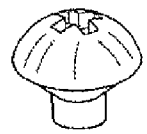 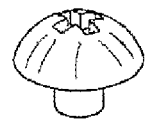
FIG. 5A   FIG. 5B   FIG. 5C   FIG. 5D
 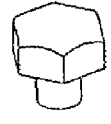
FIG. 5E   FIG. 5F
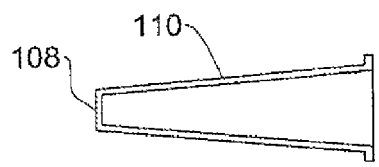 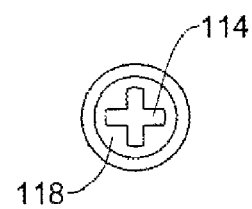
FIG. 6A   FIG. 6B
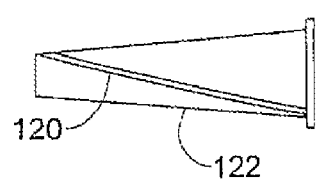 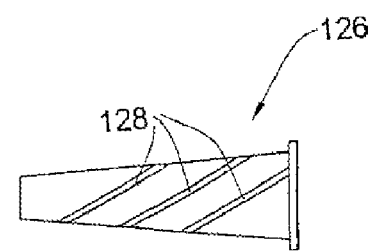
FIG. 7   FIG. 8

SELF DRILLING BOLT WITH ANCHOR

CROSS-REFERENCE TO COPENDING PATENT APPLICATIONS

This is a continuation-in-part of international patent application serial no. PCT/IL08/00288 filed Mar. 5, 1008 that was published under international patent application publication no. WO 2008/107886 A2 on Sep. 12, 2008, and claims the benefit of priority from U.S. provisional patent application Ser. No. 60/905,607 filed Mar. 8, 2007.

FIELD OF THE INVENTION

The present invention relates to fasteners and anchors for mounting and fixing articles to structural elements, and more particularly to self drilling bolts integrated with anchoring mean. Hereinafter in the specification and claims the term 'structural element' is used in its broad sense and defines, among others, walls, boards, columns, construction structures (doors and the like), etc. A fastener as referred to hereinafter is useful for securing structural elements to one another and/or for attaching/suspending therefrom various articles.

BACKGROUND OF THE INVENTION

Rivets, screws, bolts, blind rivets and masonry anchors have long been used as fasteners. Using a nail for mounting an object to a structural wall often cannot provide the necessary weight support. Some of the prior art devices require early preparation of a bore in the structural element (e.g. wall) prior to the use of the device, typically by use of machinery such as a power drill (and more likely a hammer drill or percussion hammer drill in case of masonry). At times a shank element (e.g. steel nail/spike, screw, etc.) is forcefully fixed into the bore and according to alternative solutions, an anchor device is fitted into the bore and with an appropriate screw/bolt/nail is expanded within the bore for fixedly retaining thereof. However, such anchors require pre-drilling of a bore, insertion of the anchor member, and expansion and fastening thereof. In particular this may be a problem when attending to attaching an article to a structure, e.g. a prefabricated wall's stud to a wall. This requires precision drilling also through the stud in coordination with a bore formed in the wall.

Some devices provide self boring/drilling combined with anchoring means.

One type of fastener is disclosed in U.S. Pat. No. 4,902,179 to Harker. This anchor discloses a drive-in expansion fastener is provided having a generally cylindrical, hollow body with a tapered end formed from an angular truncation of the body. The body is reinforced by at least one longitudinal rib so as to permit drive-in penetration from the tapered end even if the fastener is formed from plastic materials. The fastener is retained within the wall by at least one pair of hinged flanges which expand circumferentially in response to the threaded insertion of an ordinary screw within the hollow portion of the body. That screw engages an inclined surface within the body to cam the flanges outwardly. The flanges engage the back surface of the wall while a longitudinally slit portion of the body expands within the hole created by drive-in penetration.

Still another type of fasteners comprises a drilling/penetrating means and an anchoring means integrated therewith. U.S. Pat. No. 4,920,833 to Rosenthal discloses a blind setting rivet slidingly joined to a rivet installation tool for rotation therewith for drilling the rivet through walls, panels or components of a member. The rivet includes a shank threadingly joined to a sleeve thereon, the shank having a drilling bit on a forward end thereof. The sleeve has an enlarged flange on a rear end thereof to prevent the sleeve from passing entirely out through the hole formed in the walls, panels or components, and also to prevent the sleeve from rotating upon engagement with the walls, panels or components when the shank is rotated by the tool, thus causing the drilling bit to deform the forward end of the sleeve to form an enlarged collar to capture the sleeve within the hole formed in the walls, panels or components by the drilling bit, where the sleeve joins the walls, panels or components together. The tool has a non-circular opening to receive a non-circular mandrel section of the shank so that the tool can rotate the shank. Preferably, the tool includes a magnet to releasably secure the mandrel section therein, and a spring to eject a broken-off rear shank portion format the tool once the sleeve is deformed. The tool is adapted to be received in a conventional electric drill for rotation thereof.

U.S. Pat. No. 5,147,166 to Harker discloses an expansion-type wall anchor having a generally hollow body, a nut element, at least one, and preferably two, retention elements and an actuating element. The retention elements are pivotally connected to the nut element and transition from an orientation substantially parallel to the body to an extended position substantially perpendicular to the body once positioned behind a wall in a rearward cavity. At the end of the body opposite the nut element, the body includes an anchor head which is of greater dimension than the remainder of the hollow body. The anchor head is positioned generally transverse to the longitudinal axis of the body and secures the body to the exterior surface of the wall. The actuating element is positioned in an opening in the anchor head and extends within the length of the body to engage the nut element. Flanges extending from the anchor head preclude rotation of the anchor once it is embedded in the exterior surface of the wall. In some preferred embodiments, rotation of the actuating element creates a force which is exerted on deformable legs to cause the retention elements to transition from an orientation substantially parallel to the body to an extended position substantially perpendicular to the body. Continued-rotation of the actuating element draws the retention elements into contact with the interior surface of the wall. Once the body is in place, the actuating element can be removed and the anchor body will remain in place.

U.S. Pat. No. 6,065,918 to Adams discloses a self-drilling rivet for joining two substrate layers has a hollow sleeve member having a circular cylindrical outer surface, a divergently tapered bore, and an outwardly expandable portion. An internal member has a head portion, a threaded shank centered within the bore, and a drilling tip extending from the threaded shank. A wedge member interactive with the threaded shank can be urged by turning force toward the head portion, whereby retaining wings form from the expandable portion, and are brought to bear against one of the substrate layers. It is an object of the invention to provide an anchoring device comprising a bolt integrated with a drilling head and an anchor, to be secured to a structural element in one step, said anchoring device being substantially cheep to manufacture and simple to use.

SUMMARY OF THE INVENTION

The present invention calls for an anchoring device comprising a tapered, at least partially threaded shank comprising at a front end a drilling head and at a rear end thereof a torque applying head, and an anchor coaxially enveloping a front portion of said shank. According to the present invention there is provided an anchoring device for attaching to a structural element, said device comprising: a tapered, at least partially threaded shank comprising at a front end a drilling head and at a rear end thereof a torque applying head, said shank having an overall length $L_S$ and a drilling head diameter $D_D$; an anchor of length $L_A$ having a front end of outer diameter $D_F$ wherein $L_S > L_A$ and $D_D > D_F$ and where said anchor coaxially envelops at least a front portion of said shank; and wherein said anchor is formed with at least a rear portion having an outer diameter $D_R$ wherein $D_R > D_D$.

According to the present invention a maximal diameter of the shank $D_M$ is wider than the anchor's maximal inner diameter $D_I$ and typically, the anchor has a tapering cross section.

The anchor of the anchoring device is formed with one or more retention members for retention thereof over the shank in a rotationally free fashion.

The arrangement is such that during drilling through the structure the anchor axially displaces towards the rear end of the shank, wherein the shank tightens against an inside surface of the anchor so as to expand the anchor within the bore being simultaneously drilled, for fixedly retaining thereof within the structure.

According to further embodiments of the invention, one or more of the following arrangements may apply: —the one or more retention members may be in the form of a radial wall segments embracing portions of the shank; —the one or more retention members may be deformable upon axial progress of the shank through the anchor; a neck portion extends between the drilling head and the shank, wherein according to one embodiment, a retention member embraces the shank at said neck portion;

one or more retention members are formed adjacent a rear end of the anchor for supporting and stabilizing it over the shank;

the anchor comprises a longitudinal recess for mounting of the anchor over the shank, said longitudinal recess being for example straight or helical; —the retention member may be formed with an opening formed with a geometry for mounting over the drilling head of the shank; 'the anchor may be formed with a flared rear portion and/or a rear end of the anchor may be outwardly flanged, serving as an edge obstructor;

the anchor may be formed with structure anchoring elements protruding from its outside surface, e.g. for hanging therefrom an article, for attaching thereto an object, etc.; e.g. intermediate the rear end of the anchor and the rear end of the shank there may be a disc of external diameter greater then that of the torque applying head, or intermediate the rear end of the anchor and the rear end of the shank there is a hanging appliance;

the anchor is typically made of a rigid though plastically deformable material, e.g. plastic material, aluminum, etc; *an inside surface of the anchor may be threaded in correspondence with the threading of the shank; the anchor may be formed on its outside surface with a waste removal coiled groove, resembling that of a drilling bit;

the drilling head may be universal, i.e. suited for drilling through a variety of materials, or there may be provided different screws with different drilling heads for drilling through different materials (wood, gypsum boards, masonry, etc;)

the self drilling head is typically made of hardened material such as heat-treated tool steel, carbide tipped, etc and the shape of the drilling head may assume different shapes and configurations depending on the media through which it has to drill (wood, waliboards, plaster, concrete, brick, stone, etc.)

The term 'torque applying head' is used to denote any type of head detachably engageable with a torque applying tool (power drill, etc.) for applying thereto rotary motion and axial displacement. Such torque applying heads include, among others, flat/round headed shanks formed with a slotted cap, a Phillips cap, a hexagonal (often referred to as 'hex') head, an Allen cap (socket cap screw), etc.

The idea according to the present invention is to provide a self drilling screw and anchor, such that the drilling head can penetrate through a structural element and drill a bore, and at the same time secure the anchor within said bore owing to radial expansion of the anchor against the bore's wall by the shank of the screw. This arrangement facilitates drilling and anchoring/fixing the shank/screw using a single power tool and a single action.

In use, the anchor initially envelopes the shank of the screw (typically at a fore end thereof, i.e. adjoining the drilling head) and does not interfere with the drilling process. However, after drilling has substantially progressed the anchor is driven along the shank into the bore and is radially expanded into fixing/anchoring engagement within the drilled bore, owing to tapering diameter of the shank (and optionally owing to a widening cross section f the anchor at its rear end.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 1A-1E illustrate an anchoring device in accordance with the present invention, wherein:

FIG. 1A is an elevation of the shank/screw constituting part of the fastener in accordance with the present invention;

FIG. 1B is an enlargement of the drilling head of the shank seen in FIG. 1A;

FIG. 1C is an isometric view of the rear-torque applying head of the shank seen in FIG. 1A;

FIG. 1D is a section through a anchor constituting part of the anchoring device in accordance with the present invention;

FIG. 1E illustrates the anchor of FIG. 1D mounted on the shank of FIG. 1E in a position ready for use;

FIGS. 3A-3D illustrate an anchoring device according to a modification of the present invention, wherein:

FIG. 3A is an isometric view of the of the assembled anchoring device; FIG. 3B is a rear isometric view of the shank seen in FIG. 3A; FIG. 3C is a rear isometric view anchor seen in FIG. 3A; and FIG. 3D is a longitudinal section through the anchor seen in FIG. 3D;

FIGS. 5A-5F illustrate different variations of torque applying heads useful in a anchoring device in accordance with the present invention;

FIGS. 6A and 6B illustrate an embodiment of an anchor useful in an anchoring device according to the present invention, though formed with a different front end;

FIG. 7 illustrates still an embodiment of an anchor useful in an anchoring device in accordance with the present invention; and FIG. 8 is still an embodiment of an anchor useful in an anchoring device in accordance with the present invention.

DETAILED DESCRIPTION OF SPECIFIC EMBODIMENTS

Figure 1A:
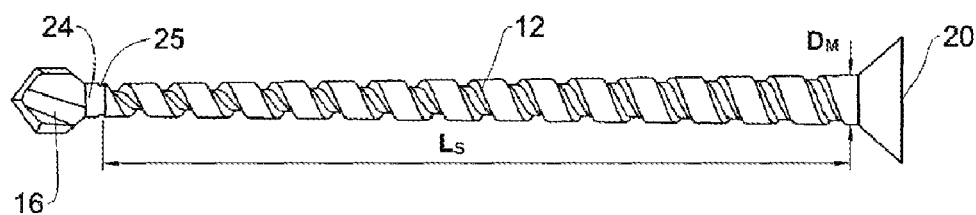

Attention is first directed to FIGS. 1A-1E for understanding the structure of the anchoring device in accordance with the present invention generally designated 10 comprising a shank (screw) 12 made of steel and comprising a threaded body portion tapering towards its front end. At the front end there is a drilling head 16, which at least this portion is hardened. At a rear end of the shank 12 there is a torque applying head 20, which in the present example is a countersunk Phillips head though, as will become apparent hereinafter in connection with FIGS. 5A-5F, it will be appreciated that other forms of torque applying heads are possible.

Intermediate with the body portion and the drilling head 16 there is a neck portion 24, which is not threaded but has a groove 25. An anchor 30 (FIG. 1D) is made of a plastically deformable material e.g. plastic, aluminum, etc., and comprises a tubular body 32 tapering towards its front and, at a front end thereof, there is a retention member 36 in the form of an inwardly wall portion formed with an aperture which at the assembled position (FIG. 1E) is fitted to the groove 25 in the neck portion 24 of shank 12 and is freely rotatable though it will not spontaneously displace backwards owing to groove 25 and/or the increasing diameter of the shank 12 extending through the retention member 36.

As can further be seen in FIG. 1D, the rear end of the anchor 30 is flared at 38 for increasing fixture of the anchor within a drilled bore, at a final drilling state, and further there is provided an outwardly extending flange 40 to secure the anchor at a substantially flush position with a structural element to which it is applied, as will become apparent hereinafter.

The body of shank 12 has a length $L_S$, the drilling head 16 has a maximal diameter $D_D$, and the rear portion of the shank 12 has a maximal diameter $D_M$. The anchor 30 has a front end outer diameter $D_F$, an overall length $L_A$, and a rear outer diameter $D_R$ at the portion where the flare 38 begins. As can be seen in the assembled position of FIG. 1E the length of the anchor is substantially shorter than that of the shank 12 ($L_A$ smaller than $L_S$) and further, the diameter of the drilling head is larger than the external diameter of the anchor's front end ($D_D$ greater than $D_F$). It is also noted that the rear outer diameter of the anchor is greater than the diameter of the drilling head ($D_R$ greater than $D_D$).

Figure 1B:
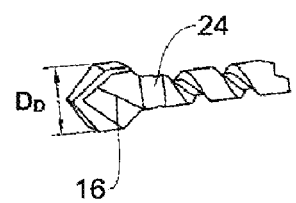
Figure 1C:
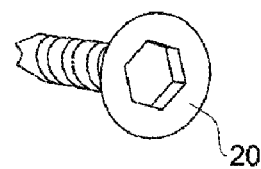
Figure 1D:
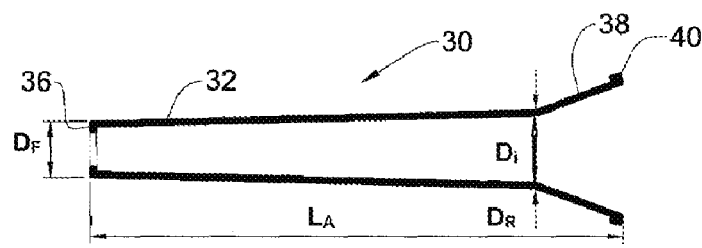
Figure 1E:
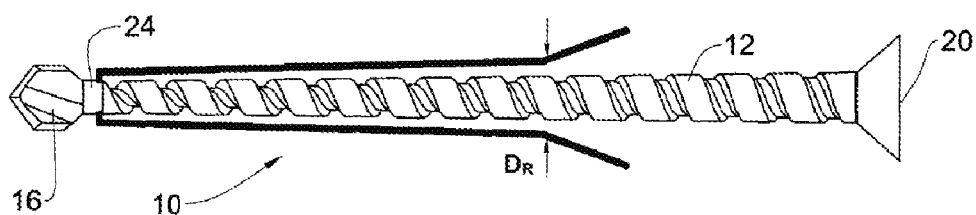

While in the particular embodiment illustrated in FIG. 1B, the drilling head 16 is a masonry-type drilling head, it is appreciated that other forms may be used just as well, e.g. for drilling through softer materials such as jimson boards, wood, etc. though a multi-purpose drilling head may be used as well.

Turning now to FIGS. 2A-2E, there are illustrated consecutive steps of using an anchoring device in accordance with the present invention. In the illustrated example the anchoring device 10 is substantially similar to that disclosed in connection with FIGS. 1A-1E and is used for securely fixing a wall board 46 to a wall portion 48, forming together a structural element.

By the use of a power tool (not shown) such as a drill, hammer drill, etc., fitted with an appropriate head for securely engaging with the torque applying head 20 (in this particular case it would be a Phillips/Cross pointed bit) torque is applied to the shank 12 causing it to rotate in the direction of arrow 50 thereby the drilling head 16 begins penetration into the board 46.

Figure 2A:
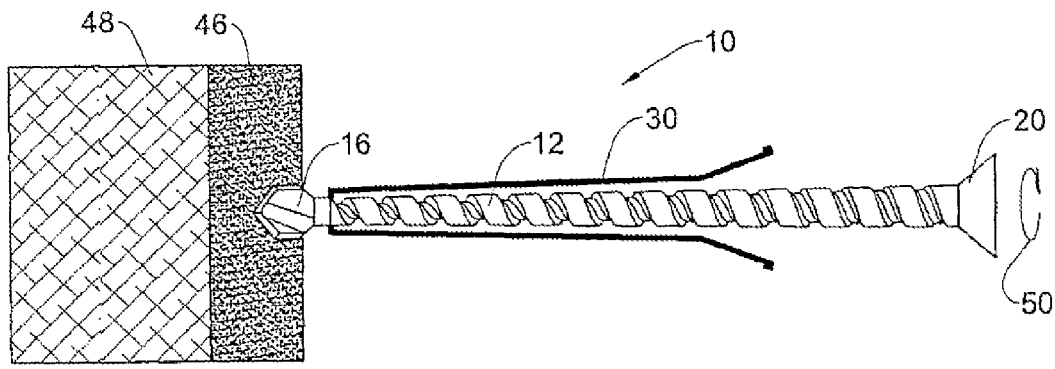
FIGS. 2A-2E illustrate consecutive steps of attaching two structural elements to one another.
Figure 2B:
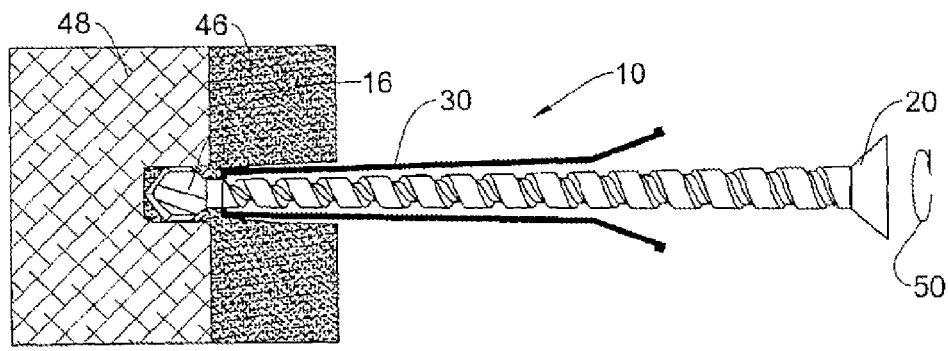
Figure 2C:
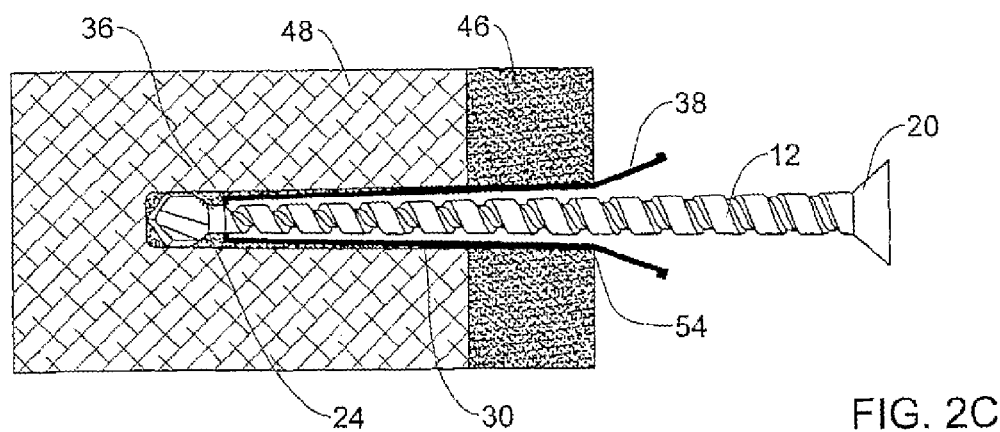
Figure 2D:
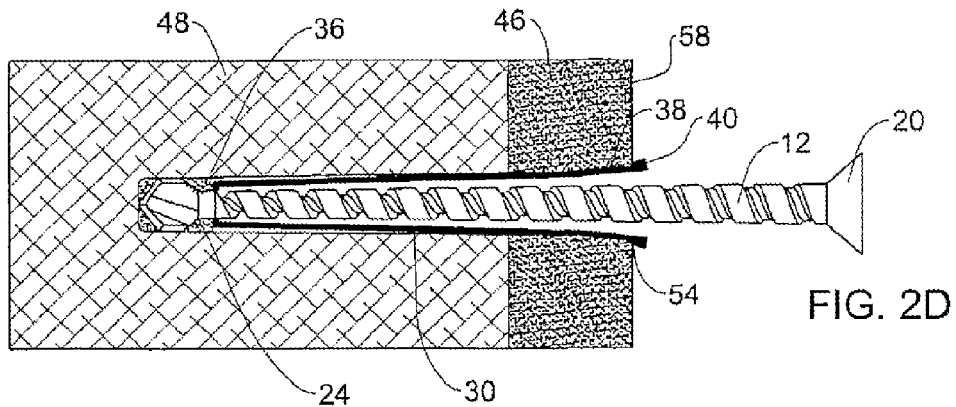
Figure 2E:
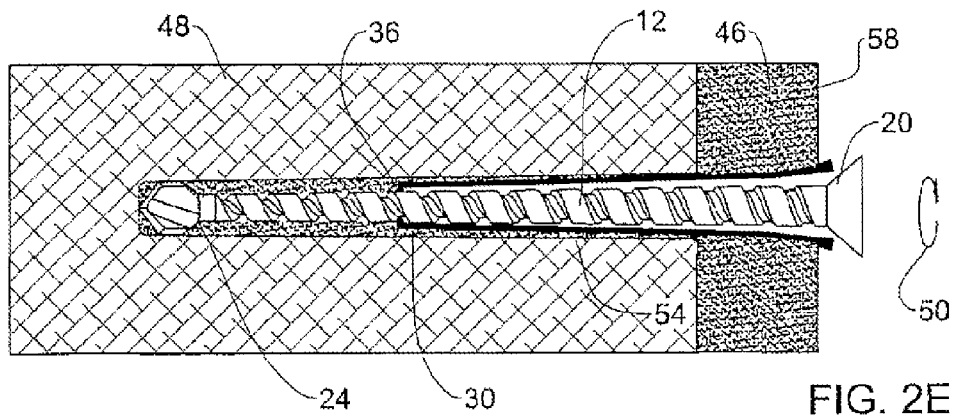

As drilling through the board 46 progresses and the shank slowly penetrates through the board 46 and into the wall 48 the anchor 30 follows the shank 12 though the retention member 36 (see FIG. 1D) does not detach from the neck portion 24 of the shank 12 such that the anchor 30 retains its position over the shank 12 (see FIGS. 2B-2D.)

A further drilling into the structural assembly (consisting of wall board 46 and wall 48) a bore of a diameter corresponding with that of the drilling head 16 is formed and as the anchor 30 is a position wherein its flared portion 38 encounters the edges 54 of the drilled bore, it deforms and is forcefully introduced into the drilled bore and progresses inwardly until the flanged portion 40 encounters the outer surface 58 of wall board 46 (FIG. 2D) to a final position of the anchor. A further rotation of the shank 12 in same direction (arrow 50 in FIG. 2E) entails disengagement of the neck portion 24 from the retention portion 36 and further progress of the shank 12 through the already fixed anchor 30 results in tight fixing of the anchor 30 against the wall board 46.

The shank (screw) 12 is tightened through the anchor 30 until sufficient force is applied (this may be by feeling or by using a torque meter) or until a minimal gap extends between the head 20 of shank 12 and the surface 58 of wall board 46.

Figure 3A:
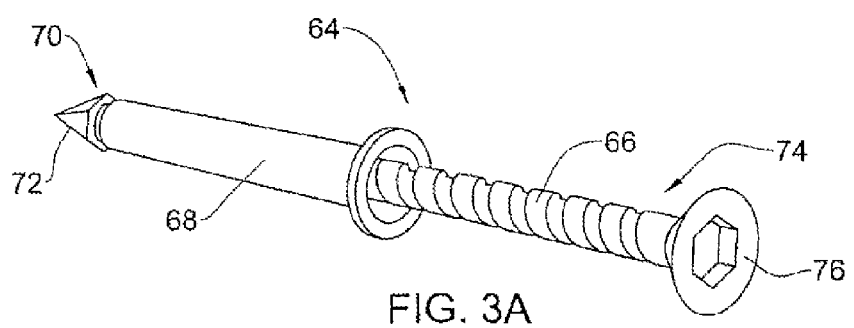
Figure 3B:
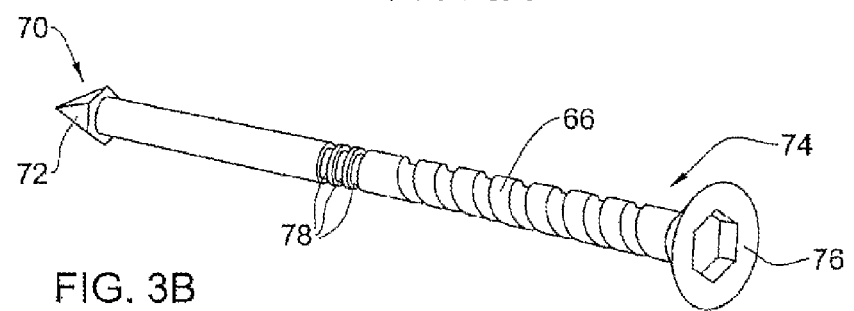
Figure 3C:
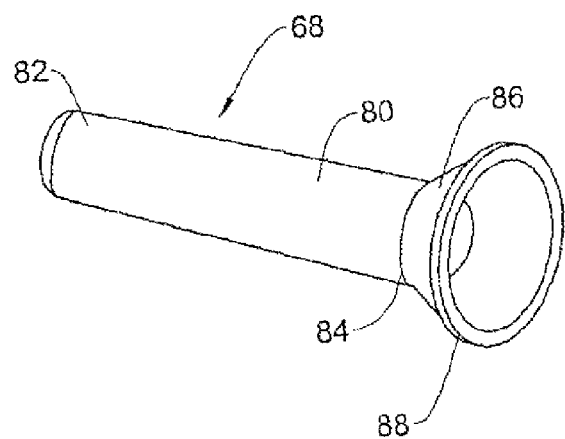
Figure 3D:
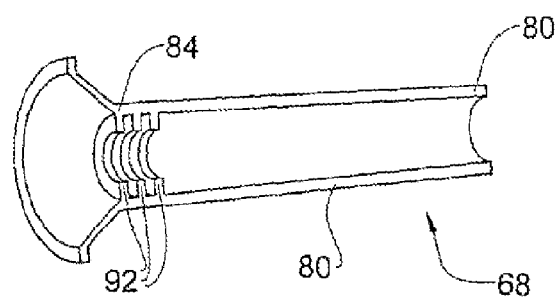

Turning now to the embodiment of FIGS. 3A to 3D there is illustrated a modification of an anchoring device generally designated 64 comprising a shank 66 fitted with an anchor 68 mounted at a front end 70 of the shank 66 (FIG. 3A). Similar to the embodiment of FIGS. 1A-1E, shank 66 is made of steel and is fitted at its front end with a drilling head 72 and has a body threaded at a rear portion 74 and tapering towards its front end 70. At a rear end of the shank 66 there is a torque applying head. The shank 66 is formed with three annular grooves 78 fitted at a mid portion thereof. Further:

the anchor may be formed with structure anchoring elements protruding from its outside surface, e.g. for hanging therefrom an article, for attaching thereto an object, etc.; e.g. intermediate the rear end of the anchor and the rear end of the shank there may be a disc of external diameter greater then that of the torque applying head, or intermediate the rear end of the anchor and the rear end of the shank there is a hanging appliance;

the anchor is typically made of a rigid though plastically deformable material, e.g. plastic material, aluminum, etc; an inside surface of the anchor may be threaded in correspondence with the threading of the shank.

Anchor 68 (FIGS. 3C and 3D) has a tubular body 80 tapering towards its front end 82, and fitted at a rear end thereof 84 with a flared portion 86 an outwardly extending flange 88. An inner surface of the anchor 68 is formed, adjacent the rear end 84 thereof, with three annularly projecting ribs 92 corresponding in size and position with annular grooves 78 of the shank 66, such that at an assembled position (FIG. 3A) the ribs 92 are engaged with the grooves 78 so as to retain the anchor 68 over the shank 66. Apart for the above differences, the dimensions ratios remain and also the mode of operation of the device.

This arrangement provides, on the one hand, retention of the anchor and its support over the shank at a substantially coaxial fashion, and further, upon drilling through a wall, the space between the shank and the anchor serves to collect dust.

It should be appreciated however, that the retention arrangement may include also the arrangement of FIGS. 1A-1E and that the one or more grooves and ribs may be otherwise distributes over the shank and anchor, respectively.

Figure 4:
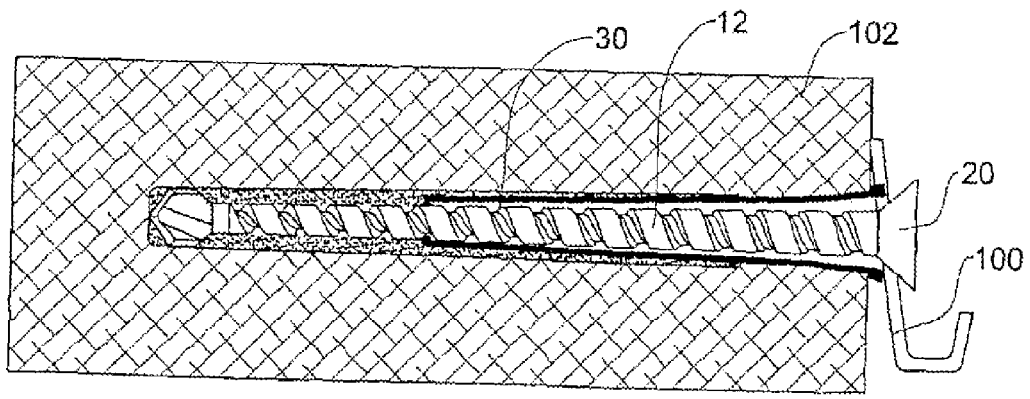
FIG. 4 illustrates how an anchoring device in accordance with the present invention is used for attaching a hook to a structural element.
Figure 9:
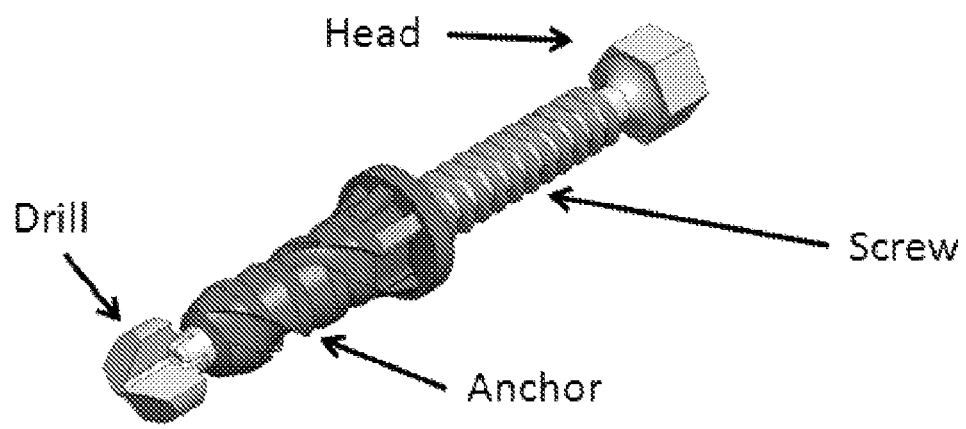
FIG. 9 is an isometric view of an integrated fastener embodiment of the invention.

The embodiment of FIG. 4 illustrates how an anchoring device in accordance with the present invention is used for attaching a hanging hook 100 to a structural element, namely, a wall 102 in the present embodiment. It is appreciated that a variety of hooks and other support means may be used in conjunction with an anchoring device in accordance with the present invention. However, such devices are a priori fitted in the gap extending between the torque applying head 20 of the shank 12 and the rear end of the anchor 30.

FIGS. 5A-5F are mere examples of torque applying heads which can be used in conjunction with an anchoring device in accordance with the present invention wherein FIG. 5A illustrates a counter-sunk hexagon socket, FIG. 5B illustrates a button hexagon socket, FIG. 5C illustrates a Phillips raised counter-sunk head, FIG. 5D illustrates a Phillips round-pan head, FIG. 5E illustrates a Phillips round-head and FIG. 5F illustrates a full bearing head. However, as already stressed hereinabove, these are mere examples only and other forms of torque applying heads are possible too, depending, upon others, on the required appearance and on the extent of torque required to be applied and the tool used for that purpose.

Assembling the anchor over the shank or reassembling for mounting a hook (e.g. hook 100 in FIG. 4) is facilitated, according to the embodiment of FIGS. 6A and 6B, by a retention member 108 of anchor 110 fitted with a cross-shaped recess 114 through which a drilling head of a shank (not shown) may be forcefully introduced such that the neck of the shank extends through the centre of the cross-shaped recess 118.

Alternatively, the anchor may be fitted over the shank by means of a recess formed along the entire length of the anchor so that it may be temporarily expanded to allow introducing the shank through the expanded recess. The recess may be straight or extend helically such as recess 120 illustrated in the anchor 122 of FIG. 7.

FIG. 8 illustrates an anchor 126 formed with coiled grooves 128 serving as waste removal grooves to facilitate removing dust from the fore end towards the rear end extending outside of the structural element. If desired, the inner surface of the anchor may be threaded or the thickness of the anchor may vary along its length, etc.

Turning to FIG. 9-22, an integrated fastener embodiment of the invention is depicted.

With respect to FIGS. 9-27, the integrated fastener (I.F) is a "one-step" screw that is inserted into a wall and is held in tight, which is operated by an electric drill. The integrated fastener's components include an anchor and a shank body that includes a torque applying head at one end, a "drill-like" head at the other end and a threaded screw portion between the torque applying head and the "drill-like" head. The I.F drills the hole with its "drill-like" head, the anchor is then inserted into the hole just made and the screw portion of the I.F is threaded into the anchor.

The I.F eliminates the need to sequentially:
Insert a drill in the electrical drill
Drill a hole in the wall
Insert a plastic anchor
Change the drill to a screw head
Thread the screw into the anchor It does all this operations in one step. The I.F consists of two parts, a steel body (FIGS. 10-18) and a plastic anchor (FIGS. 19-22) that is injected molded onto the steel body. The I.F. may be connected to the electric drill is with a nut driver bit, but such a bit may be replaced if desired by a Phillips screw bit or something else of that sort.

Figure 10:
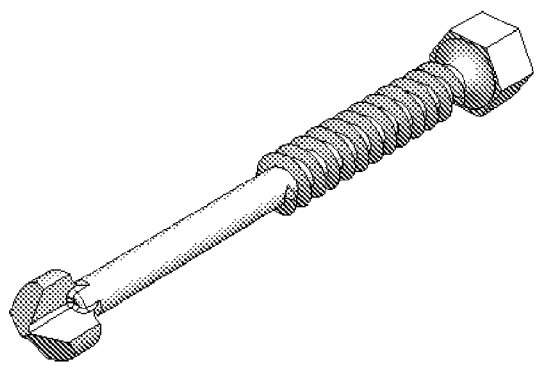
FIG. 10 is an isometric view of a body of the integrated fastener embodiment of FIG. 9.
Figure 11:
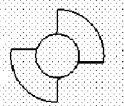
FIG. 11 is a top view of a drill portion of the body of FIG. 10.
Figure 12:
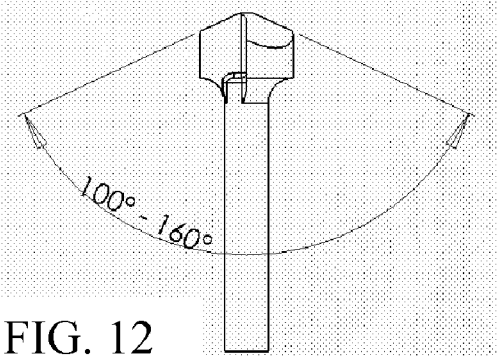
FIG. 12 is a front elevational view of the drill portion of the body of FIG. 10, with an angle identified.
Figure 13:
FIG. 13 is a rear elevational view of the drill portion of the body of FIG. 10.
Figure 14:
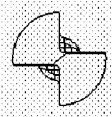
FIG. 14 is a bottom view of the drill portion of the body of FIG. 10.

Operation
The drill head drills a hole in the wall
The anchor is inserted into the wall
The debris from the wall are conveyed out of the hole by the tracks that are molded in the anchor
The anchor is stopped by its back wall and circumferential wedges
The screw is threaded into the anchor and as a result the anchor is expanded and is fixed in the wall Characteristics
Drill diameter is bigger by 0.1 mm than the anchor—this allows the anchor to fit easily in the hole and still be held in tight after it is expanded
Screw diameter is bigger than the anchor inner diameter in order for the anchor to expand in the hole and be held in tight The shank body is depicted in FIG. 10. The drill head is depicted in FIGS. 11-14. The drill head has the same proportions as a conventional masonry drill bit of standard construction. The leading angle may be varied from 100 degrees to 160 degrees as shown in FIG. 12.

Figure 15:
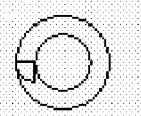
FIG. 15 is a top view of a thread portion of the body of FIG. 10.
Figure 16:
FIG. 16 is a plan view of the thread portion of the body of FIG. 10.
Figures 17, 18:
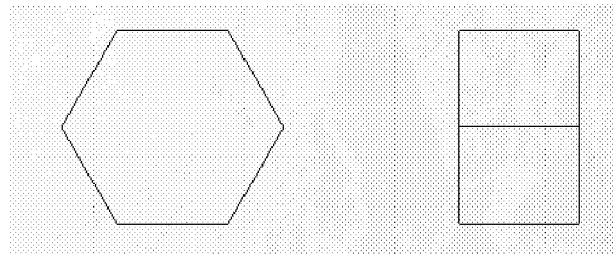
FIG. 17 is an end view of a nut head portion of the body of FIG. 10.
FIG. 18 is a plan view of a nut head portion of the body of FIG. 10.
Figure 19:
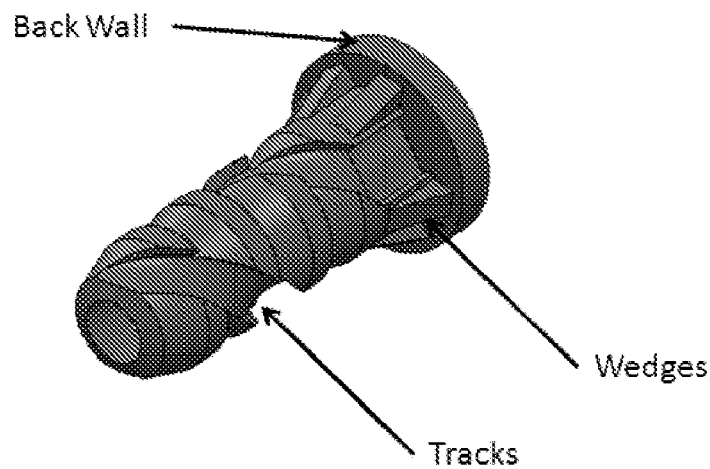
FIG. 19 is an isometric view of an anchor of the integrated fastener embodiment of FIG. 9.
Figures 20, 21, 22:
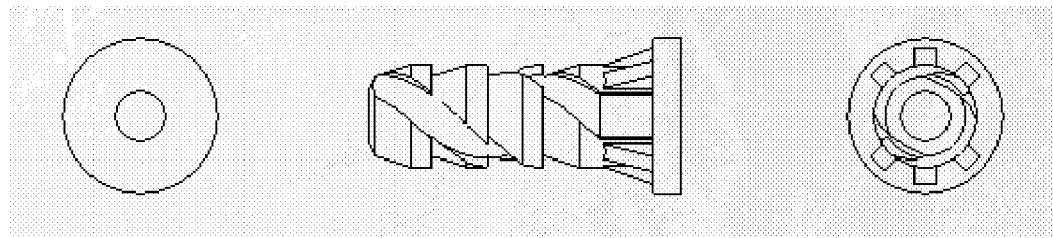
FIG. 20 is an end view of the anchor of FIG. 19.
FIG. 21 is a plan view of the anchor of FIG. 19.
FIG. 22 is an opposite end view of the anchor of FIG. 19.
Figure 23:
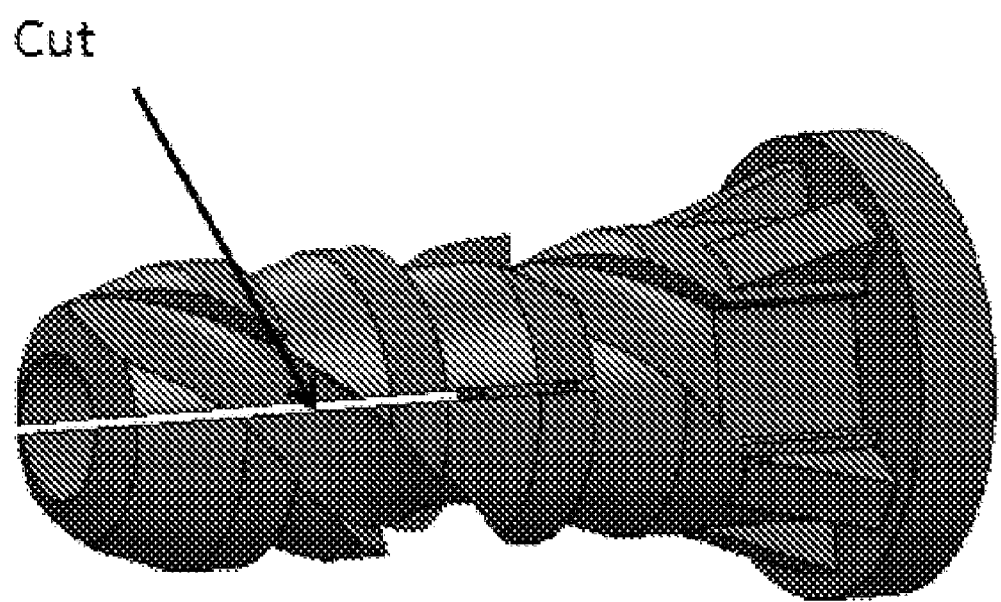
FIG. 23 is an isometric view of the anchor of FIG. 19, but with a cut.
Figure 24:
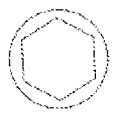
FIG. 24 is an end view of the nut head side of the integrated fastener embodiment of FIG. 9.
Figure 25:
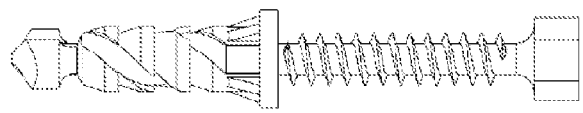
FIG. 25 is a front plan view of the integrated fastener embodiment of FIG. 9 and which is symmetric to the rear plan view.
Figure 26:
FIG. 26 is a top plan view of the integrated fastener embodiment of FIG. 9 and which is symmetric to the bottom plan view.
Figure 27:
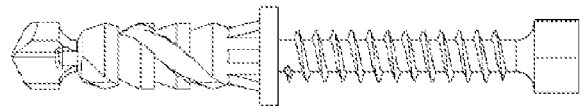
FIG. 27 is an end view of the drill head side of the integrated fastener embodiment of FIG. 9.

The screw thread is depicted in FIGS. 15-16 and is a standard screw thread having a diameter and pitch suited to a desired application. The nut head is shown in FIGS. 17-18 and has a nut shape that fits in standard nut driver bits and can be changed to a different connection type such as Phillips for example.

The shank body material may include low carbon steel for aerated autoclaved concrete (Ytong), concrete block, drywall/plasterboard, wood, etc. The anchor is shown in FIGS. 19-22 and includes a back wall, wedges and tracks. The tracks serve as guides for debris removal while drilling. The wedges and back wall fixate the anchor in the wall. In a further method, the anchor has a cut in the middle (FIG. 23) to help expand it while the screw is threaded. The anchor is made of PP plastic, but can be made of different kinds of plastic or from soft metals or any combination thereof.

FIGS. 9 and 24-27 show the I.F. in its fully assembled condition.

While several embodiments have been shown and described, it is to be understood that it is not intended thereby to limit the disclosure, but rather it is intended to cover all embodiments, modifications and arrangements falling within the scope of the present invention, as defined in the appended claims.

What is claimed is:

1. An anchoring device for fixing to a structural element comprising:
    a tapered, at least partially threaded shank;
    a drilling head located at a front end of said shank,
    a torque applying head located at a rear end of said shank, and
    an anchor coaxially enveloping a front portion of said shank, wherein an inner wall of said anchor is substantially smooth allowing relative movement between said shank and said anchor
wherein an overall length $L_S$ of said shank is longer than an overall length $L_A$ of said anchor; and wherein a diameter $D_D$ of said drilling head is greater than an outer diameter $D_F$ of said front end; and wherein an outer diameter $D_R$ of a rear portion of said anchor is greater than $D_D$, and wherein a maximal diameter $D_M$ of said shank is greater than a maximal inner diameter $D_i$ of said rear portion.

2. The anchoring device according to claim 1, wherein the anchor is formed with one or more retention members for retention thereof over the shank.

3. The anchoring device according to claim 2, wherein the one or more retention members are in the form of radial wall segment embracing corresponding portions of the shank.

4. The anchoring device according to claim 2, wherein the one or more retention members are deformable upon axial progress of the shank through the anchor.

5. The anchoring device according to claim 2, wherein a neck portion extends between the drilling head and the shank, wherein said retention member embraces the shank at said neck portion.

6. The anchoring device according to claim 2, wherein the one or more retention members are formed at least adjacent a rear end of the anchor.

7. The anchoring device according to claim 6, wherein the one or more retention members are in the form of intermittently extending grooves and ribs formed on the shank and the anchor, respectively.

8. The anchoring device according to claim 1, wherein during drilling through the structural element the anchor is adapted to axially displace towards the rear end of the shank, wherein the shank is able to tighten against an inside surface of the anchor.

9. The anchoring device according to claim 1, wherein the anchor is outwardly provided with a longitudinal recess.

10. The anchoring device according to claim 9, wherein the longitudinal recess is helical.

11. The anchoring device according to claim 1, wherein the anchor is formed with a flared rear portion.

12. The anchoring device according to claim 1, wherein a rear end of the anchor is outwardly flanged.

13. The anchoring device according to claim 1, wherein said rear end of the anchor is formed with outwardly protruding elements for connecting articles thereto.

14. The anchoring device according to claim 1, wherein the anchor is formed on its outside surface with a waste removal coiled groove.

15. The anchoring device according to claim 1, wherein intermediate the rear end of the anchor and the rear end of the shank there is a disc of external diameter greater than that of the torque applying head.

* * * * *